(12) United States Patent
Mickens

(10) Patent No.: US 8,708,102 B2
(45) Date of Patent: Apr. 29, 2014

(54) VEHICLE UTILITY LADDER

(76) Inventor: Larry Mickens, Clinton, MD (US)

(*) Notice: Subject to any disclaimer, the term of this patent is extended or adjusted under 35 U.S.C. 154(b) by 0 days.

(21) Appl. No.: 13/523,312

(22) Filed: Jun. 14, 2012

(65) Prior Publication Data

US 2012/0247871 A1 Oct. 4, 2012

Related U.S. Application Data

(62) Division of application No. 12/384,697, filed on Apr. 8, 2009, now Pat. No. 8,215,453.

(51) Int. Cl.
*E06C 1/12* (2006.01)

(52) U.S. Cl.
USPC ............ 182/127; 182/218; 182/194; 182/195

(58) Field of Classification Search
USPC .............................. 182/195, 194, 41, 218, 127
See application file for complete search history.

(56) References Cited

U.S. PATENT DOCUMENTS

| | | | | |
|---|---|---|---|---|
| 152,923 A * | 7/1874 | Smith | ......................... | 182/68.1 |
| 609,281 A * | 8/1898 | Leach et al. | ................... | 182/41 |
| 991,401 A * | 5/1911 | White | ............................. | 182/41 |
| 1,217,279 A * | 2/1917 | Coughtry | ...................... | 182/195 |
| 1,712,942 A * | 5/1929 | Smith | .......................... | 182/195 |
| 2,021,494 A * | 11/1935 | Zeman | ......................... | 182/209 |
| 2,051,060 A * | 8/1936 | Soman | ......................... | 248/210 |
| 2,194,856 A * | 3/1940 | Kostuk | .......................... | 182/126 |
| 2,348,136 A * | 5/1944 | Kidd et al. | ...................... | 182/23 |
| 2,405,453 A * | 8/1946 | Savage | ............................ | 182/97 |
| 2,874,887 A * | 2/1959 | Pompilio | ...................... | 182/195 |
| 2,993,561 A * | 7/1961 | Watson | ......................... | 182/195 |
| 3,009,534 A * | 11/1961 | Powell | .......................... | 182/119 |
| 3,061,042 A * | 10/1962 | Giles | ............................. | 182/195 |
| 3,420,331 A * | 1/1969 | Minnite | .......................... | 182/41 |
| 3,452,838 A * | 7/1969 | Gabrielson et al. | ............. | 182/28 |
| 3,653,463 A * | 4/1972 | Neal et al. | ...................... | 182/195 |
| 3,891,207 A * | 6/1975 | Helliwell | ...................... | 482/142 |
| 4,002,223 A * | 1/1977 | Bernkrant | ..................... | 182/156 |
| 4,328,880 A * | 5/1982 | Lapeyre | .......................... | 182/93 |
| 4,615,412 A * | 10/1986 | Clarke | .......................... | 182/214 |
| 4,651,480 A * | 3/1987 | Kramer | ........................... | 52/108 |
| 5,203,427 A * | 4/1993 | Williams et al. | ............. | 182/129 |
| 5,495,915 A * | 3/1996 | Weston et al. | ................. | 182/195 |
| 5,645,140 A * | 7/1997 | Mouneimneh | ................ | 182/195 |
| 5,738,186 A * | 4/1998 | Jones | ............................. | 182/195 |
| 6,328,130 B1 * | 12/2001 | Smith | ............................ | 182/107 |
| 6,378,654 B1 * | 4/2002 | Ziaylek et al. | .................. | 182/97 |
| 7,967,110 B2 * | 6/2011 | Parker | ............................. | 182/77 |
| 2006/0283665 A1 * | 12/2006 | Yao | ................................. | 182/195 |
| 2007/0209875 A1 * | 9/2007 | Chen | .............................. | 182/195 |
| 2009/0050407 A1 * | 2/2009 | Eriksson | ........................ | 182/195 |

\* cited by examiner

*Primary Examiner* — Katherine Mitchell
*Assistant Examiner* — Daniel Cahn
(74) *Attorney, Agent, or Firm* — John F. A. Earley, III; Frank J. Bonini, Jr.; Harding, Earley, Follmer & Frailey, P.C.

(57) ABSTRACT

A ladder constructed for reaching an elevated surface or object and having a bow-shaped configuration so that the reach may extend further from the base on which the footing of the ladder rests, the ladder being configured to reach areas such as the roof of a vehicle.

20 Claims, 5 Drawing Sheets

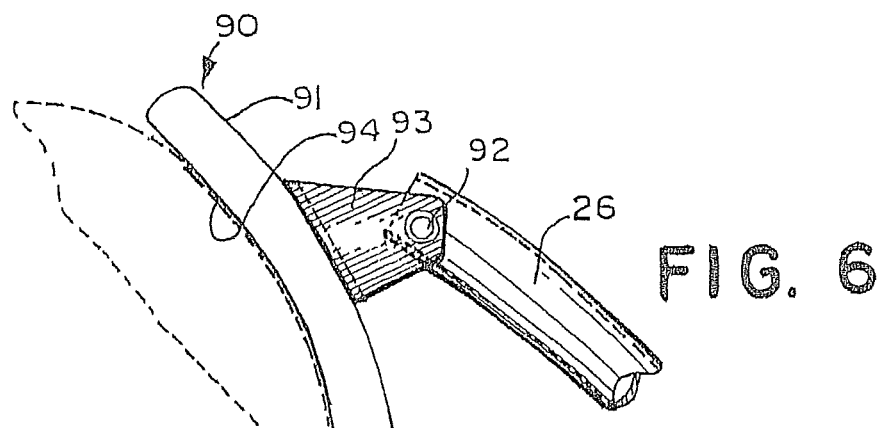
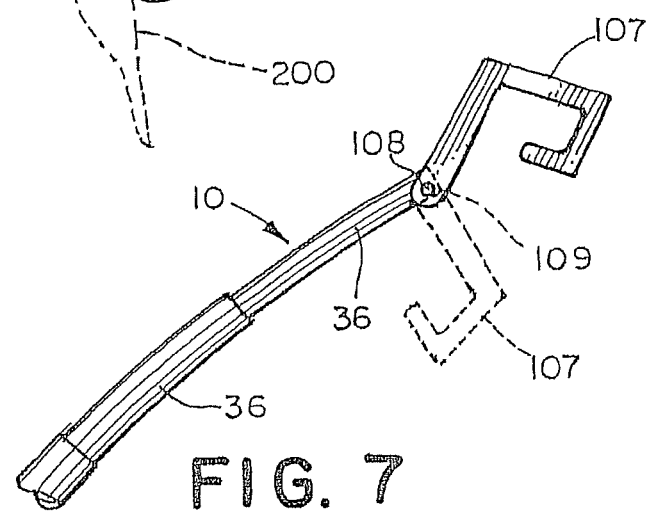
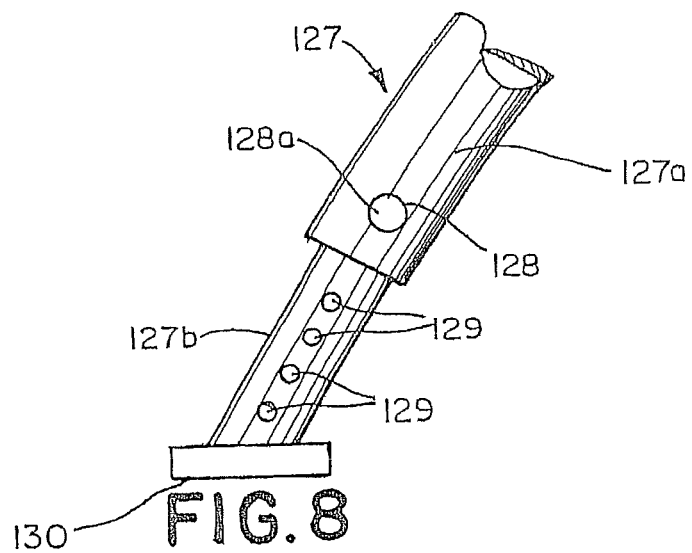

VEHICLE UTILITY LADDER

CROSS-REFERENCE TO RELATED APPLICATIONS

This application claims priority to, and is a divisional of, application Ser. No. 12/384,697 filed on Apr. 8, 2009 now U.S. Pat. No. 8,215,453, the complete contents of which are herein incorporated by reference.

BACKGROUND OF THE INVENTION

1. Field of the Invention

The present invention relates to ladders and more particularly to ladders that may be used in locations which are partially obstructed, and, in particular, to reach the tops of vehicles.

2. Brief Description of the Related Art

Ladders have been widely utilized for allowing a person to reach a higher location in order to reach objects or perform certain work tasks. Ladders are devices that are positioned at a location so that a user may reach the desired elevated location. Many ladders are constructed from a series of horizontally spaced apart rungs which are mounted between two vertical supports. One type of ladder provides two vertical supports and is commonly referred to as a fixed ladder. In some cases, the fixed ladder may be provided with an extension that slides to provide additional height when needed. This latter type of ladder is referred to as an extension ladder.

Another popular type of ladder is a step ladder. Step ladders are typical of the ladders for general household use, and usually are configured as an A-frame with two vertical sections joined together at one end and forming an angle. Step ladders may be a couple of feet, or may be on the nature of ten to fifteen feet, or greater. However, as A-frame type step ladders increase in height the separation of the vertical sections also must increase. The step ladders generally are constructed so that the vertical sections may fold on each other to facilitate moving and storing the ladder.

Step ladders have certain drawbacks. Because the ladder must adequately provide stability, the vertical ladder sections must be separated from each other on the ground. The top of the ladder, where the vertical ladder sections are hinged or joined, is therefore positioned at a location between the span of the vertical legs. In other words, considering a step ladder where the legs rest on the ground and are separated by about six feet, the top of the ladder generally will be inward about three feet from each vertical section. This means that as one climbs the ladder rungs and elevates his or her position, he or she is more centrally located. The step ladder, therefore, has limitations on positioning and how close one may be able to come to an elevated structure or object.

A fixed ladder or extension ladder, for example, may be placed up against a wall. However, the ladder generally is at least a fixed length, at a minimum, and therefore, must be positioned away from the wall to provide the correct reaching height. In addition, the fixed ladder top (the portion resting against the wall) will be nearest the wall, but locations along the ladder such as half-way up the ladder, would be remote from the wall. This happens because the ladder generally is not designed to be vertically positioned, but must be angled in a manner to provide stability. If one needs to reach only a location at the top of the resting point of the fixed (or extension) ladder, then the ladder may be suitable. However where one desires to reach a point lower, the ladder may prove too distant from the surface desired to be reached. One therefore may require multiple ladders of different lengths in order to reach different locations.

A need exists for a ladder which may provide a user with the ability to reach elevated surfaces and facilitate access to a vertical or lateral surface.

SUMMARY OF THE INVENTION

A ladder is provided which has the capability to facilitate reaching an elevated surface or object. According to embodiments of the invention, the ladder has a bow-shaped configuration so that the reach may extend further from the base on which the footing of the ladder rests. Preferred embodiments of the ladder are provided to reach the top of a vehicle preferably without interfering with mirrors, handles, trim or other items on the vehicle.

The ladder, according to preferred embodiments, may be constructed with sections that are collapsible and receivable within other sections, so that the ladder may be stored and transported in a compact form. The ladder may be telescopically constructed so that leg sections may be received within other leg sections.

According to embodiments, the ladder may be extendible to different lengths by configuring the number of sections that telescope outward relative to the compact form (where ladder sections may be stored together, collapsed, (i.e., unextended)). According to embodiments, the ability to select the length of the telescopic extension or a range of choices of length for the extension may be provided.

The ladder may include a locking mechanism to lock the desired sections in place to provide further support to the ladder structure when erected.

One example of the use of the ladder is that it may be set against a surface to form an arc, where the bowed configuration of the ladder may span over an object or obstacle, such as, for example, a counter, and be positioned under another object or fixture, such as, for example, a shelf.

The ladder has utility in connection with a wide range of applications where prior ladder types are not suitable. For example, automobiles, such as sport utility vehicles (SUV's) and trucks tend to have heights that make it difficult for a person to reach the roof or top. Access to the vehicle top often is required in order to clean or prepare the surface, attach luggage (to a luggage rack or carrier), or mount items such as roof racks and cargo carriers. Often, one finds some assistance by standing on the door jambs or bumpers. However, in some instances, standing on the door jambs or bumpers may damage the vehicle, and, moreover, where the activity involves washing the vehicle, opening a door to stand on the jamb or transom may cause water to enter the cabin of the vehicle, as it is difficult to clean a vehicle's top without water or soap dripping from the top.

The present invention provides a convenient device for reaching the tops of large vehicles, such as trucks and SUV's. The configuration of the ladder, according to embodiments, is provided having a bowed shape, and includes footing that may rest on the ground or floor, as well as elements that may rest against or attach to a vehicle. According to some embodiments, the ladder has a resting element, which, preferably, is constructed from a soft or resilient material in order to provide protection against surface scratches on the surface that the ladder engages.

According to embodiments, the ladder has a base which may include feet that are designed to be placed on a surface, such as the ground, to support the ladder.

According to preferred embodiments, the foot may be provided with a portion that is adjustable to stabilize the ladder on uneven surface conditions. According to some embodiments, the foot may pivot or rotate to rest on a surface at a desired position.

The device may be constructed with extensions provided on one or more of the ladder legs or leg sections that enable the height of one leg to be adjusted relative to the other leg. For example, according to some embodiments, each side leg may have an adjustable member which may be positioned so that the ladder may be stabilized to rest at a level position, such as, for example, when one leg of a ladder is resting on a step. These and other advantages may be provided by the invention.

BRIEF DESCRIPTION OF THE DRAWING FIGURES

FIG. 6 is a left side elevation view showing the terminal leg section of a ladder (in partial view) according to the invention with an alternate end portion.

FIG. 7 is a right side elevation view showing the terminal leg section of a ladder according to the invention with an alternate end portion including a hook element.

FIG. 8 is a right side elevation view of an alternate embodiment of a leg section showing an adjustable leg portion and sleeve.

DETAILED DESCRIPTION OF THE PREFERRED EMBODIMENTS

Figure 1:
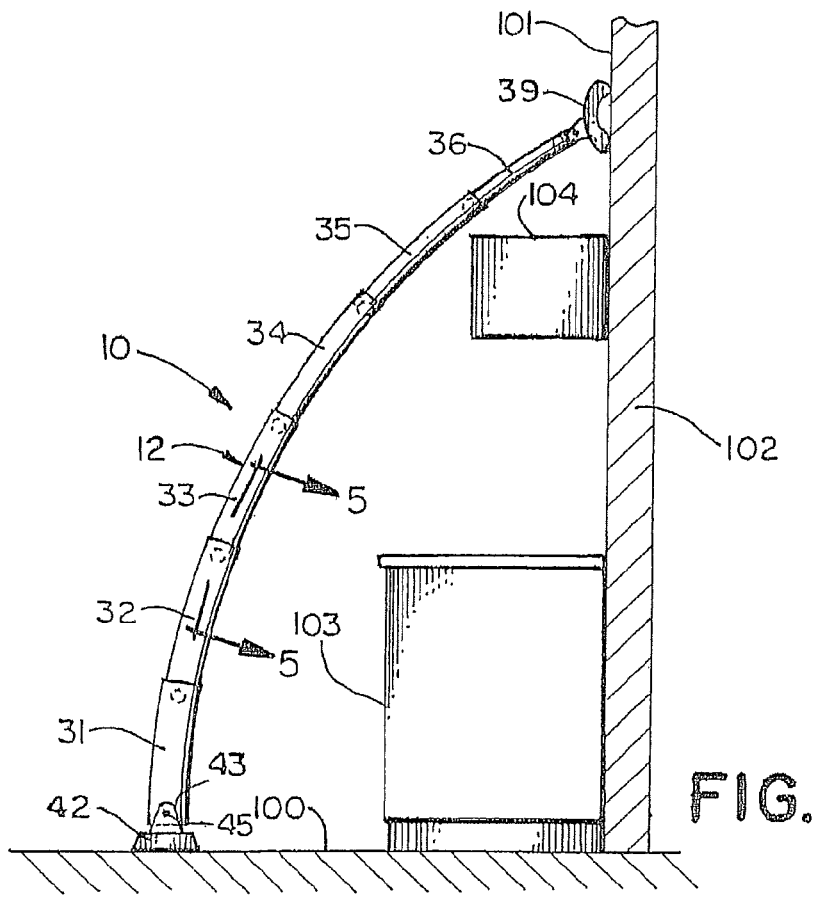
FIG. 1 is a right side elevation view of a ladder according to my new invention shown in an environment where a surface mounted element, such as a cabinet, is mounted on a wall and another element, such as a counter, is protruding out from the wall.

A ladder 10 is provided for facilitating access by a user to elevated locations proximate to a structure or near an obstacle. Referring to the exemplary embodiment illustrated in FIGS. 1 and 2, there is shown a bow-shaped ladder 10 having a first side leg 11 and a second side leg 12 with a plurality of rungs 13, 14, 15, 16, 17, 18 disposed between the first side leg 11 and second side leg 12. The rungs 13, 14, 15, 16, 17, 18 are supported on the first side leg 11 and second side leg 12, and preferably, are connected to thereto. The environment depicted in FIG. 1 represents an example of a potential use for the ladder 10. The ladder 10 is shown supported on a floor or ground surface 100. Though the ladder 10 is illustrated having a particular bowed arc, the ladder 10 may be constructed with an arc that is dimensioned for the environment or applications for which the ladder will be used.

The ladder 10 is configured with a series of leg sections (21, 22, 23, 24, 25, 26 and 31, 32, 33, 34, 35, 36) which are connected to form the ladder structure. The first leg 11 is shown having a plurality of leg sections, and in the exemplary embodiment illustrated in FIG. 2, includes six leg sections 21, 22, 23, 24, 25, 26 which are connected to form one side of the ladder 10. The base leg section 21 is shown having a resting element illustrated as the first foot 41. Each intermediate leg section 22, 23, 24, 25 preferably connects at each end to a serially adjacent next leg section (e.g., the base leg section 21 in the case of the second leg section 22, and the terminal leg section 26 in the case of the near terminal leg section 25). The upper leg section 26, which is a terminal leg section in the exemplary embodiment, terminates the ladder first leg 11. Similarly, a plurality of leg sections 31, 32, 33, 34, 35, 36, including a second base leg section 31 and a second terminal leg section 36, are also shown in the exemplary ladder embodiment in FIGS. 1 and 2. A second foot 42 is provided on the second base leg section 31. Though the ladder 10 is illustrated in the exemplary embodiment with intermediate sections, other embodiments may provide fewer or greater numbers of leg sections depending on the reach and strength for which the ladder is designed, or both.

A resting element 38, 39, such as, for example, a gripping sleeve or a plastic or rubber like element or coating, may be provided on the end of each terminal leg section 26, 36 to facilitate stabilizing the ladder 10 against a surface that the ladder 10 engages, such as the wall surface 102 shown in FIG. 1. The ladder 10 is shown having a first foot 41 and a second foot 42. In FIG. 1, the second foot 42 of the second leg portion 12 rests on the ground 100. Though the ground 100 is illustrated to be substantially level, in the event uneven ground or surface is encountered, the foot 42 (as with the first foot 41, see FIG. 2) may be adjustably provided as a movable member so that the second foot 42 may be positioned at a location on the ground to stabilize the ladder 10.

Figure 2:
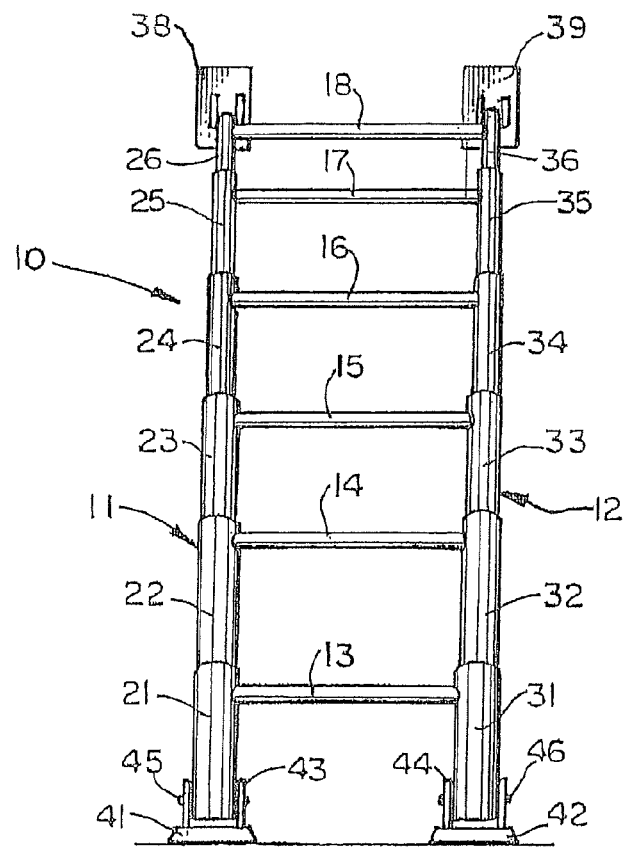
FIG. 2 is a front elevation view of the ladder of FIG. 1, shown apart from the environmental objects (the wall, cabinet and counter).

According to one embodiment, the feet 41, 42 may comprise traction feet (including rubber grips or the like) that may be pivotally connected to the lower or base leg sections 21, 31, respectively. For example, the traction feet 41, 42 may be constructed as illustrated in FIG. 13 of U.S. Pat. No. 7,222, 696, issued on May 29, 2007, the complete disclosure of which is herein incorporated by reference. Alternately, a rotatable grommet, not shown, may be used to mount one or both feet 41, 42 to its respective base leg section 21, 31, so that the position of the traction feet 41, 42 may have rotational degrees of freedom for facilitating the stabilization of the ladder 10 on uneven surfaces. FIG. 2 illustrates an example of positionable feet 41, 42, where mounting arms 43, 44 and fastening elements, such as mounting pins 45, 46 secure the respective mounting arms 43, 44 to the base leg sections 21, 31.

The ladder 10 is shown having a bow-shaped configuration that arches toward the surface 101 of the wall 102. In the environment illustrated in FIG. 1, the ladder 10 is shown supported against the wall 102. The environment illustrated in FIG. 1 has a first obstacle, which for example may be a cabinet or counter 103, and an overhanging object 104 (such as a wall cabinet, oven, or other item). The bow-shaped configuration may be provided with different arcs depending on the embodiment.

Figure 3:
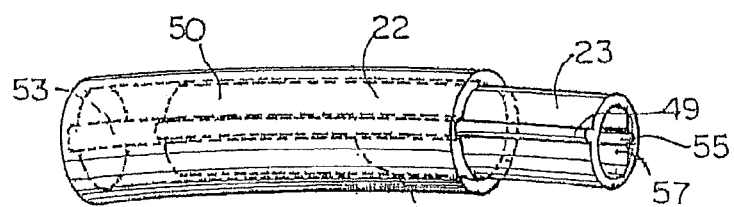
FIG. 3 is an enlarged perspective view of adjacent leg sections showing an example of tracks and grooves employed for facilitating collapsing and extending the ladder.
Figure 4:
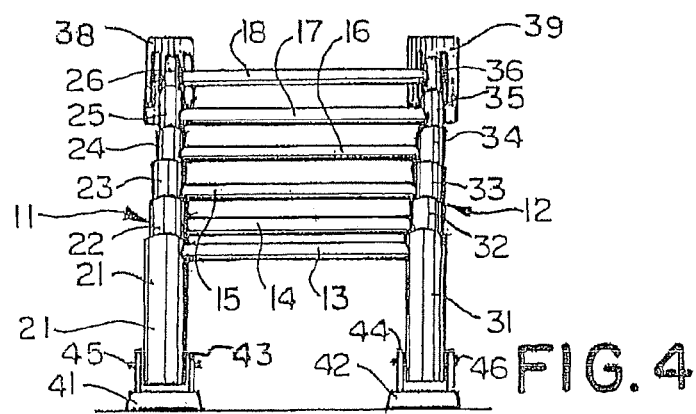
FIG. 4 is a front elevation view showing the ladder in a collapsed condition.

The ladder first leg sections 21, 22, 23, 24, 25, 26 and second leg sections 31, 32, 33, 34, 35, 36 preferably are provided having a collapsible configuration so that the leg sections may be collapsed to facilitate storage of transport of the ladder 10. According to one embodiment, the leg sections 21, 22, 23, 24, 25, 26 and 31, 32, 33, 34, 35, 36 are provided having a tubular configuration being dimensioned and sized so that one leg section may be received, either fully or partially, within another leg section. For example, as illustrated in FIG. 3, a preferred embodiment of a collapsing arrangement is provided. Two leg sections 22, 23 are shown collapsed, where each leg section 22, 23 (i.e., those above the base leg section 21) are received within a lower or adjacent leg section. The ladder rungs 13, 14, 15, 16, 17, 18 are disposed on the leg sections of the first leg 11 and second leg 12 at locations so that the rungs 13, 14, 15, 16, 17, 18 may stack when the ladder 10 is configured to its collapsible condition, as represented in FIG. 4, (or otherwise be positioned and arranged to permit the ladder 10 to be collapsed). According to one embodiment, the ladder rungs 13 are provided so that they are located at positions along the leg sections 21, 22, 23, 24, 25, 26 and 31, 32, 33, 34, 35, 36 which permit the leg sections to be telescoped outward for forming the extended ladder 10 (FIG. 2) and retracted by collapsing the sections to minimize the ladder 10 (FIG. 4) for storage or transport. The ladder rungs 13, 14, 15, 16, 17, 18 may be attached to a leg section with suitable attachment means, such as, for example, adhesive, bolts or other suitable fastening mechanisms. Alternately or in addition to the fastening elements, the rungs 13, 14, 15, 16, 17, 18 may be molded with one or more of the leg sections. According to alternate embodiments, the ladder 10 may be provided with rungs that are configured to collapse horizontally.

According to another embodiment, the ladder leg sections may be constructed having a conical or frustoconical configuration, which preferably is angled or arched in a particular direction. Embodiments also may provide leg sections having different lengths and with degrees of arc so that the bow shape is accentuated or minimized, depending on the desired use of the ladder. For example, the lower portion of the ladder 10 may be configured having less of an arc than the upper portion. The leg sections may be dimensioned and sized to accommodate the change in the arc so that the ladder 10 may be collapsed and extended, as needed.

Referring again to FIG. 1, the ladder leg sections 31, 32, 33, 34, 35, 36 of the second side leg 12 are shown having a bow-shape and arch over a first obstacle 103 and span toward the wall surface 101 to engage the wall 102 at a location above the second obstacle 104. The ladder 10 is conveniently positioned to facilitate access to the locations adjacent to the span of the ladder 10. The ladder rungs 13, 14, 15, 16, 17, 18 begin furthest from the wall 102, with the lower rung 13, and gradually approach the wall 102 over the length of the ladder first leg 11 and second leg 12 (see the ladder 10 shown in the view of FIG. 2 illustrating the rungs).

The ladder 10, according to a preferred embodiment, has a bowed configuration and is constructed to collapse so that it is shorter and more manageable to store and transport. One preferred arrangement involves constructing the leg sections so that each subsequent leg section is received within another leg section, preferably a lower leg section. Engaging elements may be provided to facilitate sliding of the leg sections 21, 22, 23, 24, 25, 26 and 31, 32, 33, 34, 35, 36. One example of engaging elements includes a track and groove arrangement employed to facilitate sliding of the leg sections relative to each other. FIG. 3 illustrates an exemplary embodiment where first leg ladder leg sections 22, 23 are provided with a track and groove arrangement. A single set or a plurality of tracks and grooves may be provided, and may be arranged to be spaced apart from each other or arranged adjacently. Referring to FIG. 3, the track 49 and groove 53 are vertically disposed along the leg sections 23 and 22, respectively. Leg section 23 is shown received within the base adjacent leg section 22. A track 49 is illustrated being provided on the exterior 50 of the base adjacent leg section 22 of the first leg 11. Groove 53 located on the interior of the base adjacent leg section 22 is matingly configured to engage with the track 49 of the leg section 23 so that that serially upper next adjacent leg section (e.g., leg section 23) may move along and be guided within the base adjacent leg section 22. Though a single track 49 is illustrated, additional arrangements and configurations of tracks, or pairs of tracks, including oppositely situated tracks (not shown), may be used to further facilitate movement and stability of the leg sections 21, 22, 23, 24, 25, 26 and 31, 32, 33, 34, 35, 36. Preferably the movement of the leg sections is accomplished by sliding movement, where a leg section, such as the leg section 23, slides along another leg section, e.g., the base adjacent leg section 22, to extend or collapse the ladder 10 (depending on which way the relative sliding occurs). The base adjacent leg section 22 in addition to having first engaging elements, such as, for example, the track 49, may include further engaging elements, such as, for example, the groove 55 provided on the interior 57 of the adjacent leg section 23. Grooves may be formed by depressions provided in the interior of a leg section. Alternately grooves may be formed by ridges or other elements. Preferably, the leg sections are constructed having compatible shapes so that a next adjacent section may be received within a lower section. Though FIG. 3 illustrates two leg sections 22, 23, the other leg sections may be similarly configured. In addition, arrangements of engaging elements, though shown on interior and exterior leg surfaces, may be provided on one or the other or both. The leg sections, when extended, secure themselves in the extended configuration so that the ladder 10 may be used. Though not illustrated in the sections shown in FIG. 3, a locking mechanism may be used in conjunction with adjacent ladder leg sections.

A locking mechanism may be employed to lock the leg sections of a ladder leg together. The locking mechanism may be actuated when the leg sections are extended (as shown in FIGS. 1 and 2) to hold the leg sections in place so the ladder 10 may receive a force load, such as the weight of a person using it. Preferably, the locking mechanism is disengageable so that the ladder 10 may be collapsed when desired.

According to another embodiment, a locking mechanism, such as those described herein, may be used in conjunction with the enlarged and/or constricted configuration. The locking mechanism may include elements provided at the ends of the leg sections, so that the locking may be accomplished when the leg sections are extended. The ladder length, bowing arc, or both, may be controlled by providing a plurality of alternate locking positions along the leg sections to permit the leg sections to lock at one or more designated positions relative to another leg section. The location and arrangement of the locking elements preferably are provided so that the selected location option provides all or a sufficient number of rungs to be available. For example, where a locking mechanism includes a lock pin (or pins), the receiving member, such as a pin receiver or bore, may be provided proximate the end of a leg section, and perhaps also at a point a bit further from the end of the leg section to provide an additional positioning option for the leg sections.

Figure 5:
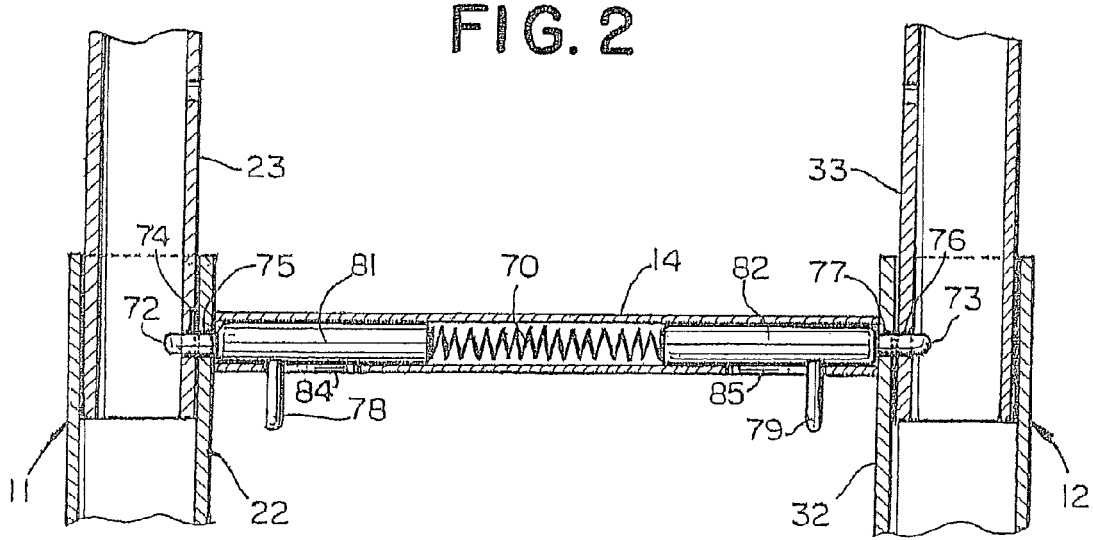
FIG. 5 is an enlarged sectional view of an exemplary embodiment of a locking pin shown with ladder sections illustrated in partial view.

According to one embodiment, locking pins, which may be spring loaded, or mechanically engageable, may lock the leg sections of each ladder leg 11, 12 in an extended arrangement when the leg sections 21, 22, 23, 24, 25, 26 and 31, 32, 33, 34, 35, 36 are expanded from the collapsible configuration (see the FIG. 4 configuration). One example of a locking pin arrangement is illustrated in FIG. 5, where a biasing mechanism, such as a spring 70, is provided in a housing which generally may be the ladder rung 14, as shown. The spring 70 biases pins 72, 73 through apertures 74, 75 and 76, 77 provided in the walls of adjacent leg sections, such as the leg section 22 and adjacent leg section 23. Stops 78, 79 may be provided on the pin shafts 81, 82, respectively, to prevent the pins 72, 73 from moving entirely through the apertures. The pin shafts 81, 82 also may be dimensioned to serve as stops, in addition to, or alternative to, the stop 78, 79. The housing or rung 14 may be used to contain the spring 70 and stops 78, 79 as well as the pin ends 72, 73. The stops 78, 79 are movable through the slots 84, 85 respectively to withdraw the pins 72, 73 to collapse the ladder 10. One example of a locking pin arrangement that may be utilized is that provided in U.S. Pat. No. 5,495,915, the complete disclosure of which is herein incorporated by reference, where a retractable pin is biased with a spring to extend through an aperture to prevent the ladder from collapsing.

A spring element (not shown) may be provided in one or more leg sections to bias the leg sections to an extended configuration. A stop or other controllable actuator may be provided so that the spring actuation is controlled so as not to bias the ladder to extension until desired. The stop or actuator may include a release to disengage the stop and enable extension of the ladder 10. The spring element (not shown) preferably is positioned and dimensioned so that it does not interfere with the engaging elements, such as the groove 52 and track 49 (FIG. 3).

According to another embodiment, the leg sections 21, 22, 23, 24, 25, 26 and 31, 32, 33, 34, 35, 36 may be configured to be larger (in width or diameter) at one end and have reduced widths or diameters at another end. In this arrangement, the constricted dimension portion may facilitate retention of an adjacent leg section. Accordingly, an adjacent leg section may have an enlarged lower portion so that when the adjacent leg section, such as, for example, the base adjacent leg section 22, is extended from the base leg section 21, the base adjacent leg section 22 may not be entirely removed from the lower adjacent section (the base leg section 21). Accordingly, other adjacent leg sections, such as those 21, 22, 23, 24, 25, 26 and 31, 32, 33, 34, 35, 36, may be constructed with larger and/or constricted dimensions.

Optionally or in addition to the features provided, the ladder 10 may include an adjustably provided leg section. Preferably, one or more of the lower base leg sections may be adjustably provided so that it may be positioned in one of a range of different lengths. For example, according to an alternate embodiment, a leg section 127 is illustrated in FIG. 8 having a sleeve portion 127a and slidable leg portion 127b. A set screw 128 and adjustment knob 128a are provided to secure the slidable leg portion 127 in a position relative to the sleeve portion 127a of the leg section 127. A plurality of threaded adjustment apertures 129 are shown disposed in the slidable leg portion 127b so that the leg section 127 may be configurable to be of a height (or length) desired by a user. Though not shown, the other leg of the ladder 10 may be constructed with the alternate base leg section configuration similar to the leg section 127 shown and described in FIG. 8. The adjustment is useful when an uneven surface is encountered, such as a step or slope, for example, where one side of the ladder 10 is at an elevated level (e.g., on a step) relative to the other side (e.g., on the ground). In addition, the foot 130 illustrated as being connected to the slidable leg section 127, alternately may be provided as a traction foot, such as those 41, 42 described and shown herein. According to another embodiment, the lower leg sections 21 and 31 may be constructed with the adjustment mechanism shown and described in U.S. Pat. No. 6,729,440 issued on May 4, 2004, the complete disclosure of which is herein incorporated by reference. According to yet another alternate embodiment, the adjustable leg portion may be constructed with an exterior track system, such as that shown in U.S. Pat. No. 5,718,306 issued on Feb. 17, 1998, the complete disclosure of which is herein incorporated by reference. Another alternate embodiment of an adjustment mechanism for the ladder 10 may be configured with a lock pin, as disclosed in U.S. Pat. No. 7,222,696 issued on May 29, 2007, the complete disclosure of which is herein incorporated by reference.

According to a preferred embodiment, the ladder 10 may be configured to mate with the contour of a vehicle, such as, for example, the edge of the roofline of an automobile 200 (FIG. 6). The terminal leg section, such as those 26, 36, or an attachment thereto, such as, for example, a gripping element 38, 39 (FIGS. 2 and 4), may have a matingly associated configuration that matches the contour of the top edge of a vehicle. This may be useful for carrying out work on the vehicle, such as, for example, installing roof racks, washing or detailing the vehicle, or repairing the vehicle (e.g., a sunroof panel).

FIG. 6 illustrates an example of a contour feature of the ladder 10, showing one embodiment of a contour terminal element 90. The contour terminal element 90 may, for example, be constructed as part of a terminal leg section of the ladder 10, or alternately, or in addition thereto, may include a terminal element, such as the contour component or gripping mechanism 91 which maybe removably attachable to the terminal leg sections 26, 36 (or the ladder end, such as a ladder rung, e.g., the highest rung). The contour component 91 is illustrated including attachment means shown as a fastening element 92 which secures a flange 93 of the contour component 91 to the terminal leg section 26 of the first side leg 11. The contour component 91 preferably is constructed from or has a surface portion 94 which is made from a material, such as natural or synthetic rubber, or other elastomeric type materials, which facilitate gripping a surface and minimizing or preventing scratching of the surface. Though FIG. 6 shows a single fastener element 92, another fastening element and flange may be provided to secure the contour component 91 to the upper leg section 36 of the second ladder leg 12. According to an alternate embodiment, the contour component 91 may be connected to the leg section 26 with a swivel joint to allow for vertical and lateral positioning of the contour component 91, as well as potential rotational positioning. The swivel joint may be positionable and lockable to a desired position. One or more pivot or swivel axes may be used to connect the gripping mechanism. The gripping mechanism 91 may be provided on each terminal leg section 26, 36 of the ladder 10 so that each gripping element 91 may be positionable independent of the other (i.e., the gripping element on the other one of the terminal legs 26, 36).

In addition to a swivel joint, or as an alternative, the gripping mechanism may be provided to have an extendable arm so that the gripping member 91 may be positioned closer to or further from a surface. For example, where a wall has a protruding structure, the extendible arms permit one aim to be at one extendible length and another arm to be at a different extendible length so that each gripping element 91 of each terminal leg section 26, 36 is able to engage the wall (or other structure), thereby facilitating stability of the ladder 10. The extendible arms (not shown) may be configured with a track and groove arrangement, as well as a set screw (which may have a hand-tightening knob) so that the arms may be slid into or out of a terminal leg section 26, 36 (or other leg sections, if desired) to which the arms are mounted. Locking pins, stops, teeth or other elements may be used to secure or facilitate positioning and retention of the arm at a desired extended position relative to the leg sections.

Referring to FIG. 7, alternately, the gripping mechanism may be configured as a hook element 107. The hook element 107 may be constructed from or covered with a finish or material that will not scratch a vehicle surface. The hook element 107 may be attached to the terminal leg sections 26, 36 in any of the same manners described herein with the other gripping elements, such as the contour element 91. Preferably a hook element 107 is attached to each terminal leg section 26, 36. The hook element 107 may be provided to attach to a roof rack of a vehicle so that the ladder 10 is supported, and, further, may be provided in pairs, with one hook element 107 connected to the terminal leg section 26, 36 of the ladder 10. According to a preferred embodiment, the hook element 107 and the bow-shape of the ladder 10 preferably may be constructed so that the ladder 10, when used with a vehicle, permits the user to reach the top of the vehicle and position the ladder 10 so it does not scratch or otherwise damage the vehicle. The hook element 107 further may be configured as a claw or other grip to be matingly associated with a structure on the vehicle to which it is designed to connect (e.g., roof rack or rail).

Though the hook element 107 may be configured as a stationary member, according to a preferred embodiment, the gripping mechanism may be provided as a foldable member, such as the foldable hook element 107. The foldable hook element 107 may be constructed with a pivot joint 108 and include a spring locking mechanism and release button 109 so that the hook element 107 may remain in its upright, unfolded position for use, or be folded and remain folded for storage (shown in phantom in FIG. 7). Alternately, the hook element 107 may be configured for use in the folded condition where the hook element 107 may serve a dual purpose gripping element function when the hook element 107 engages against a surface, such as, for example a wall. According to one embodiment, a folding mechanism used to connect the hook element 107 to the ladder leg sections 26, 36 may be constructed as disclosed in U.S. Pat. No. 7,322,583 issued on Jan. 29, 2008 to Daniel Kim, the complete disclosure of which is incorporated herein by reference.

Figure 9:
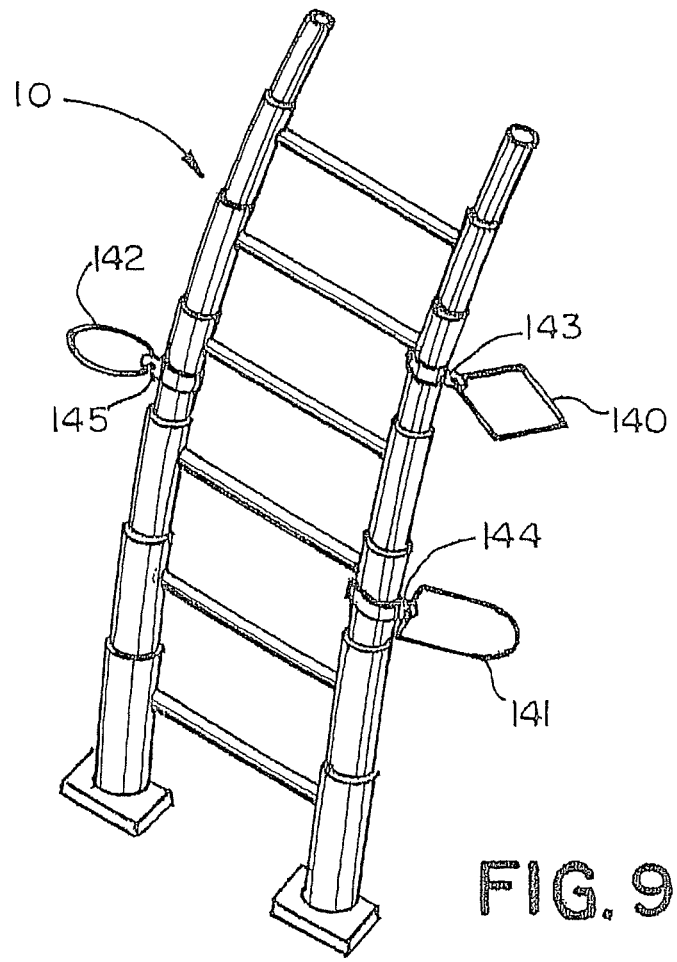
FIG. 9 is a perspective view of a ladder according to my invention shown with optional holding elements for holding items on the ladder.

A holding mechanism for holding objects also may be provided. The holding mechanism may be constructed with one or more holding elements that are configured for holding items at a location proximate to the side legs 21, 31 of the ladder 10 in convenient reach to users. The holding mechanism may include holding elements, such as, for example, shelves, sleeves, rings or other members. Referring to FIG. 9, one embodiment of a holding mechanism is shown including rings 140, 141, 142 designed to holding objects. The rings 140, 141, 142 may be constructed, for example, like the rings disclosed in U.S. design Pat. No. D306,507. The rings 140, 141, 142 may be secured with straps 143, 144, 145, clamps or other suitable attachment means. The rings 140, 141, 142 may be sized having diameters that may accommodate and hold items that may be used with the ladder 10, such as, for example, a can (e.g., wax), a bottle, a rag, or other products. The rings 140, 141, 142 may be detachably provided so that they may be removed from the ladder 10 when they are not needed, and replaced as needed. Though not shown, holding elements, such as, the rings 140, 141, 142 illustrated in FIG. 9, may have a construction with a swingable joint (not shown) so that the rings are collapsible to fold alongside the ladder sides 21, 31 for facilitating collapsing and storing the ladder 10.

Figure 10:
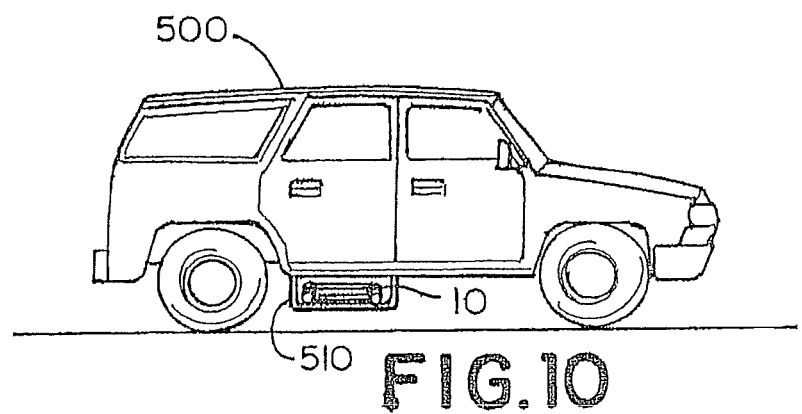
FIG. 10 is a side elevation view of a vehicle configured with a holder for holding the ladder.

The ladder 10 may be finished with a coated or painted surface for use with vehicles. The ladder 10 may be painted and finished to match the vehicle color. For example, the ladder 10 may be collapsible for storage in a vehicle, or may be supplied with a storage device, such as a housing, track, rack or the like, which may be constructed and designed to accommodate the ladder 10 (e.g., in a collapsed condition) for storage. FIG. 10 illustrates a vehicle 500 with a holder 510 for holding the ladder 10. Though not shown, the holder 510 may include retaining members, such as, for example, straps grooves, or other suitable elements for securing the ladder 10 on the holder 510. The ladder 10 may be sized and contoured for use in conjunction with the vehicle, so that the use of the ladder 10 enables reaching the top of the vehicle.

Figure 11:
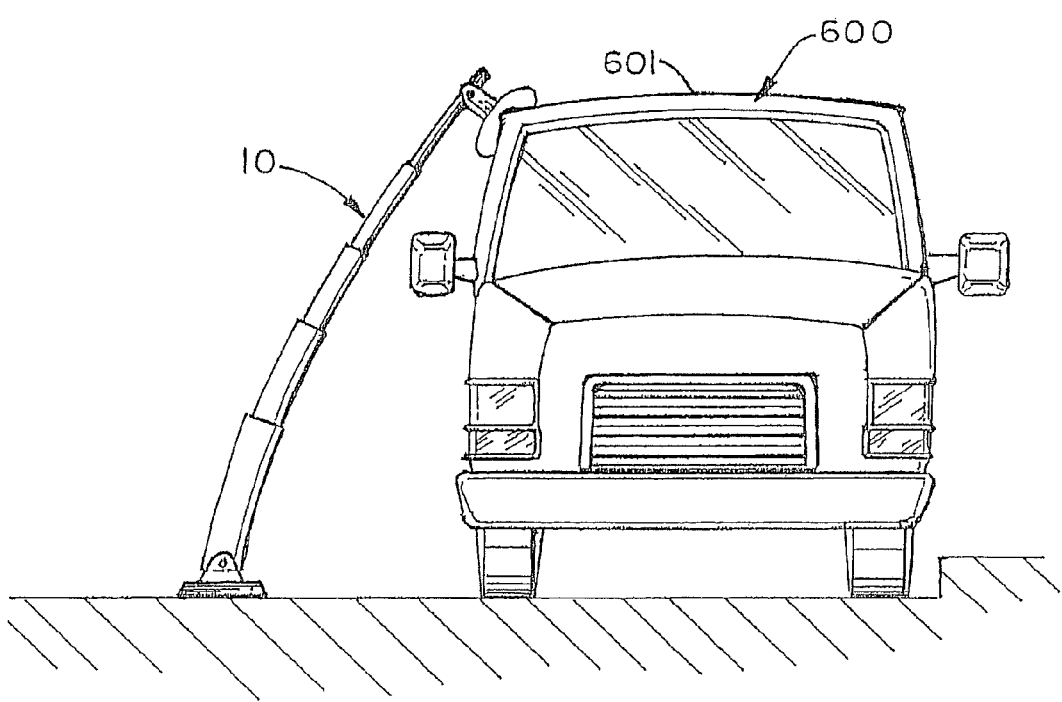
FIG. 11 is a front elevation view of a vehicle showing the ladder of FIGS. 1-5 with the alternate end portion of FIG. 6, the ladder being shown in a side elevation view.

FIG. 11 shows the ladder 10 in use with a vehicle 600. The ladder 10 rests on the vehicle roof edge 601. Though not shown, the vehicle 600 may have a holder for holding the ladder 10 when the ladder 10 is in its collapsed condition (see FIG. 4).

While the invention is broadly described, other modifications and variations within the spirit and scope of this invention may be made. For example, the leg sections according to some embodiments may be constructed from liquid metal, titanium, graphite, or other metallic compounds, as well as plastic materials. Though preferred constructions of the ladder may be made from metal, plastic or combinations thereof, other suitable materials may be used, such as those materials having sufficient strength to support the weight (such as that of a person) required for the use of ladder.

What is claimed is:

1. A bow-shaped, collapsible, telescopic ladder, comprising:

a plurality of bowed-shaped sections, telescopically connected in series, the plurality of sections including a top section and a bottom section;

the plurality of sections being configured such that when extended in series and retracted for storage the ladder forms a bowed shape that extends from the bottom section to the top section;

the top section having a gripping mechanism comprised of a neo-foam material and being mounted on said top section for contacting and gripping a surface;

the bottom section having a foot for stabilizing the ladder;

each section respectively having a locking release mechanism to secure the respective section in an extended position when desired and for releasing the respective section to permit it to be retracted when the ladder is to be stored, and each section respectively has two legs connected by a rung; and storage means for storing said ladder on a vehicle;

wherein each section has an upper end and a lower end, and wherein each section is smaller in cross-sectional width at its upper end relative to its cross-sectional width at its lower end.

2. A vehicle having a top and at least one side and including:

storage means for storing a ladder;

a bow-shaped, collapsible, telescopic ladder, comprising:

a plurality of bowed-shaped sections, telescopically connected in series, the plurality of sections including a top section and a bottom section;

the plurality of sections being configured such that when extended in series and retracted for storage the telescopic ladder forms a bowed shape that extends from the bottom section to the top section;

the bottom section having a foot for stabilizing the telescopic ladder;

each section respectively having a locking release mechanism to secure the respective section in an extended position when desired and for releasing the respective section to permit it to be retracted when the telescopic ladder is to be stored, and each section respectively has two legs connected by a rung; and wherein each section has an upper end and a lower end, and wherein each section is smaller in cross-sectional width at its upper end relative to its cross-sectional width at its lower end;

said telescopic ladder having gripping means for gripping engagement with said vehicle, wherein said gripping means is configured to conform to one or the other or both of said vehicle top and said at least one side of the vehicle.

3. The vehicle of claim 2, wherein the sections are constructed from one or more of the group consisting of: liquid metal, titanium, graphite, and metallic compounds.

4. The vehicle of claim 2, wherein the sections are constructed from plastic materials.

5. The vehicle of claim 2, wherein said gripping means comprises a gripping mechanism that is extendible.

6. The vehicle of claim 2, wherein the vehicle has a contour, wherein the telescopic ladder is configured for use with said vehicle, and wherein said gripping means comprises a gripping mechanism having a shape corresponding with the contour of said vehicle.

7. The vehicle of claim 2, wherein
each of the telescoping sections has at least one leg and connecting means that connect adjacent sections of said telescoping sections to each other, said connecting means comprising engagement elements disposed along each telescoping, and wherein each of said locking release mechanisms comprises a spring loading mechanism with an actuatable release to release a spring from a first compressed condition to a second extended condition where said telescoping sections are extendible by said spring release.

8. The vehicle of claim 2, wherein said device is finished to match or coordinate with a color of at least one of said vehicle top and said at least one side.

9. The vehicle of claim 2, wherein said top and at least one vehicle side join to form a joining location having a contour, and wherein said gripping means is configured to correspond with the contour of said joining location.

10. The vehicle of claim 2, wherein said storage means comprises a compartment for receiving said telescopic ladder therein, and wherein said storage means is capable of having retaining members for securing said telescopic ladder within said compartment.

11. The vehicle of claim 2, wherein said telescopic ladder and said vehicle are finished to match.

12. The vehicle of claim 2, further comprising holding means provided on said telescopic ladder for holding items.

13. The vehicle of claim 12, wherein said holding means comprises one or more of rings, shelves or sleeves.

14. The vehicle of claim 2, wherein said rungs are disposed on the sections, said rungs being vertically spaced apart from each other, said rungs being arranged in a bowed configuration when the telescopic ladder sections are extended.

15. The vehicle of claim 2, wherein said sections comprise at least one first set of bowed-shaped telescoping sections forming a first telescopic ladder side and at least a second set of bowed-shaped telescoping sections forming a second telescopic ladder side, and wherein each of said first set of bowed-shaped telescoping sections and said second set of bowed-shaped telescoping sections respectively comprises at least one leg section that is received within at least one other leg section of said first and second sets of bowed-shaped telescoping sections respectively.

16. The vehicle of claim 2, said rungs being vertically spaced apart from each other, and said rungs spacing respective sets of said two legs to which said rungs connect, wherein said plurality of rungs are arranged in a bowed configuration when the telescopic ladder sections are extended.

17. The vehicle of claim 2, wherein said gripping means comprises a gripping mechanism comprised of neo-foam, and wherein said gripping mechanism is mounted on said top section for contacting and gripping a surface.

18. A ladder for facilitating reaching over an obstacle, said ladder comprising:
a first side leg section and a second side leg section;
said first side leg section being constructed from a plurality of leg sections;
said second side leg section being constructed from a plurality of leg sections;
rungs disposed between said first side leg section and said second side leg section, said rungs being vertically spaced apart from each other, and spacing said first side leg section from said second side leg section,
wherein said first side leg section plurality of leg sections and said second side leg section plurality of leg sections comprise bowed sections respectively, and
wherein each of said plurality of leg sections respectively form an arch shaped ladder configuration for reaching over an object;
wherein said first side leg section and said plurality of leg sections forming said first side leg section are bowed in a first direction and connected to define a major ladder length, said plurality of connected first side leg sections forming said first side leg section are serially arranged so that there is at least one first side leg base section and at least one additional section connected thereto, wherein said plurality of first side leg sections and said plurality of second side leg sections are collapsible, said plurality of first side leg sections are tubular respectively and at least one of said tubular leg sections is received within another of said tubular leg sections when the ladder is collapsed; and
wherein each of said first side leg section and said second side leg section has an upper end and a lower end, and wherein each of said plurality of leg sections of said first and second side leg sections respectively is smaller in cross-sectional width at its upper end relative to its cross-sectional width at its lower end; and
wherein said ladder includes storage means for storing said ladder on a vehicle.

19. The ladder of claim 18, wherein
said second leg section has at least one base leg section, and wherein each said at least one base leg section has at least one adjustable portion that can be extended to lengthen at least one of said first side leg section and said second side leg section.

20. The ladder of claim 18, wherein
at least one leg section of said first side leg section and at least one leg section of said second side leg section respectively comprises a terminal leg section having at least one engaging element provided thereon for engaging a surface, wherein a swivel joint is provided on each of said terminal leg sections respectively, and wherein each said at least one engaging element is connected to a respective one of said terminal leg sections with a respective one of said swivel joints, each said engaging elements being positionable throughout a range of positions for facilitating engagement with a surface.

* * * * *